United States Patent
Andres et al.

(10) Patent No.: US 10,243,453 B1
(45) Date of Patent: Mar. 26, 2019

(54) COMMON MODE NOISE CANCELATION IN POWER CONVERTERS

(71) Applicant: Apple Inc., Cupertino, CA (US)

(72) Inventors: Joao L. Andres, Austin, TX (US); Bogdan T. Bucheru, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/847,173

(22) Filed: Dec. 19, 2017

Related U.S. Application Data (60) Provisional application No. 62/563,927, filed on Sep. 27, 2017.

(51) Int. Cl.
*H02M 1/44* (2007.01)
*H02M 3/335* (2006.01)
*H02M 1/12* (2006.01)
*H02M 1/32* (2007.01)

(52) U.S. Cl.
CPC ......... *H02M 1/44* (2013.01); *H02M 3/33523* (2013.01); *H02M 1/12* (2013.01); *H02M 1/32* (2013.01); *H02M 2001/123* (2013.01)

(58) Field of Classification Search
CPC .......... H02M 1/44; H02M 1/12; H02M 1/126; H02M 1/32; H02M 1/08; H02M 2001/123; H02M 3/33523; H02M 3/33553; H02M 3/335; H01F 27/2804; H01F 27/29
See application file for complete search history.

(56) References Cited

U.S. PATENT DOCUMENTS

| | | | |
|---|---|---|---|
| 3,963,975 A | 6/1976 | Gauper, Jr. | |
| 4,625,270 A * | 11/1986 | Taylor | H02M 3/155 363/20 |
| 6,879,500 B2 | 4/2005 | Liu | |
| 2004/0032753 A1 * | 2/2004 | Liu | B29C 45/76 363/39 |
| 2006/0158814 A1 * | 7/2006 | Wasaki | H03H 7/09 361/118 |

(Continued)

OTHER PUBLICATIONS

Chan, et al., "Effective Switching Mode Power Supplies Common Mode Noise Cancellation Technique with Zero Equipotential Transformer Models," Twenty-Fifth Annual IEEE Applied Power Electronics Conference and Exposition (APEC), Feb. 21-25, 2010.

(Continued)

*Primary Examiner* — Gustavo Rosario Benitez
(74) *Attorney, Agent, or Firm* — Blank Rome LLP (57) ABSTRACT

This disclosure describes a circuit, a method, and a system to mitigate common mode noise in a power converter. The converter may include a transformer that isolates input and output terminals with primary and secondary windings. The transformer may further include an auxiliary winding coupled in anti-parallel with a secondary winding. The auxiliary winding may inject a common mode current through a compensation capacitor and a Y-capacitor to cancel a common mode current induced at the secondary side to the primary side. The converter may include a coupler circuit that provides a varying impedance at different frequencies to facilitate the current injection and allocate voltages between the compensation capacitor and the Y-capacitor. A voltage clamping circuit may be employed to protect a coupler capacitor from overvoltage.

20 Claims, 5 Drawing Sheets

(56) References Cited

U.S. PATENT DOCUMENTS

| | | | | |
|---|---|---|---|---|
| 2007/0153554 | A1* | 7/2007 | Matsumoto | H02M 3/33592 363/16 |
| 2009/0212754 | A1* | 8/2009 | Ryan | H02M 1/14 323/282 |
| 2011/0090715 | A1* | 4/2011 | Hosotani | H02M 1/126 363/17 |
| 2011/0234126 | A1* | 9/2011 | Meyer, III | H02P 29/0241 318/400.3 |
| 2012/0275195 | A1* | 11/2012 | Cividino | H02M 3/28 363/15 |
| 2013/0214607 | A1 | 8/2013 | Harrison | |
| 2014/0118868 | A1* | 5/2014 | Wang | H02H 9/08 361/42 |
| 2014/0292419 | A1* | 10/2014 | Ragonese | H03B 5/02 331/46 |
| 2015/0109824 | A1* | 4/2015 | Chen | H02M 3/22 363/17 |
| 2015/0222125 | A1* | 8/2015 | Brunker | H01R 13/6633 307/42 |
| 2016/0181008 | A1* | 6/2016 | de Groot | H01F 27/385 363/127 |
| 2017/0047848 | A1* | 2/2017 | Huang | H02M 3/33507 |
| 2018/0166205 | A1* | 6/2018 | Whittle | H01F 27/28 |

OTHER PUBLICATIONS

Cochrane, et al., "Passive Cancellation of Common-Mode Noise in Power Electronic Circuits," IEEE Transactions on Power Electronics, vol. 18, No. 3, May 2003.

\* cited by examiner

COMMON MODE NOISE CANCELATION IN POWER CONVERTERS

TECHNICAL FIELD

This disclosure relates generally to the field of power converters and, in particular, to common mode noise cancelation in flyback converters.

BACKGROUND

Commercial power converters are required to meet various electromagnetic interference (EMI) emission standards. EMI emission includes common mode noise. A power converter may generate common mode noise from semiconductor switching operations. For example, a flyback converter may include a primary switch coupled in series with a primary winding of a transformer, and a secondary switch (e.g., a diode or synchronous rectifier) coupled in series with a secondary winding of the transformer. The primary switch may be switched on/off to regulate an output voltage of the flyback converter, thus generating voltage transients (dV/dt) across the primary and secondary switches. These switches may be attached to heat sinks that may be further coupled to a chassis that may also serve as a ground connection for the circuit. These connections, as well as parasitic capacitances of various circuit components, may create a path from the switches to ground. The voltage transients, acting on the parasitic capacitances, may generate common mode currents $i_{CM}=C \times dV/dt$, where C represents the parasitic capacitance, which may cause magnetic flux and common mode noise.

When a transformer is employed in a power converter, e.g., in a flyback converter, the common mode current generated in the primary side may flow to the secondary side through inter-winding capacitance between the transformer's primary and secondary windings, and vice-versa. Thus, one way to address the common mode noise issue is to add an inter-winding shield (e.g., an electrostatic screen) in a transformer to block transmission of the currents. For example, a shield layer may be inserted between the primary and secondary winding. For safety considerations, the shield layer may be connected to a primary return terminal (PRTN), i.e., ground at the primary side, thus recirculating the common mode current induced by the primary switch back to the PRTN. However, currents may still be induced at the secondary side and flow to the primary side, e.g., through the shield layer. Due to fabrication limits, it may be difficult to include addition of more shield layers in the transformer that are connected also to the secondary return (SRTN), i.e., ground at the secondary side. In other words, common mode currents generated at the secondary side may still flow back to the PRTN. Thus, what is needed is an approach to mitigate common mode noise, including the inducement of common mode noise from the secondary side to the primary side.

SUMMARY

This disclosure describes a circuit, a method, and a system to mitigate common mode noise in a power converter, for example, a flyback converter. The flyback converter may include a transformer that isolates input and output terminals, thus creating a primary side with a primary return terminal and a secondary side with a secondary return terminal.

The transformer may further include an auxiliary winding, electromagnetically coupled with a primary winding of the transformer but in an opposite polarity to a secondary winding. The auxiliary winding may be coupled to a Y-capacitor through a compensation capacitor, wherein the Y-capacitor may be further coupled to PRTN. Because the auxiliary winding possesses an opposite polarity, it may generate a common mode current via the compensation capacitor that may cancel (e.g., nullify or negate) the common mode current induced in the secondary side and returned to the primary side.

The flyback converter may further comprise a coupler impedance, for example, parallel-connected coupler capacitor and optional resistor, between the SRTN and the Y-capacitor. The coupler impedance may adjust the allocation of voltages between the compensation capacitor and the Y-capacitor, thus protecting the components and accommodating compliance with various requirements of performance and/or safety testing, for example, insulation testing and surge testing. Further, by utilizing the Y-capacitor, the flyback converter may reduce the physical size and/or capacitance of the compensation capacitor, thus resulting in a more compact footprint for the flyback converter.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one" or "another" embodiment in this disclosure are not necessarily to the same or different embodiment, and they mean at least one. To be concise, a given figure may be used to illustrate the features of more than one embodiment, or more than one species of the disclosure, and not all elements in the figure may be required for a given embodiment or species.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form to avoid obscuring the disclosure. In the interest of clarity, not all features of an actual implementation are described in this disclosure. Moreover, the language used in this disclosure has been principally selected for readability and instructional purposes and has not necessarily been selected to delineate or circumscribe the full inventive scope of the disclosed subject matter, which is defined by the appended claims.

Figure 1:
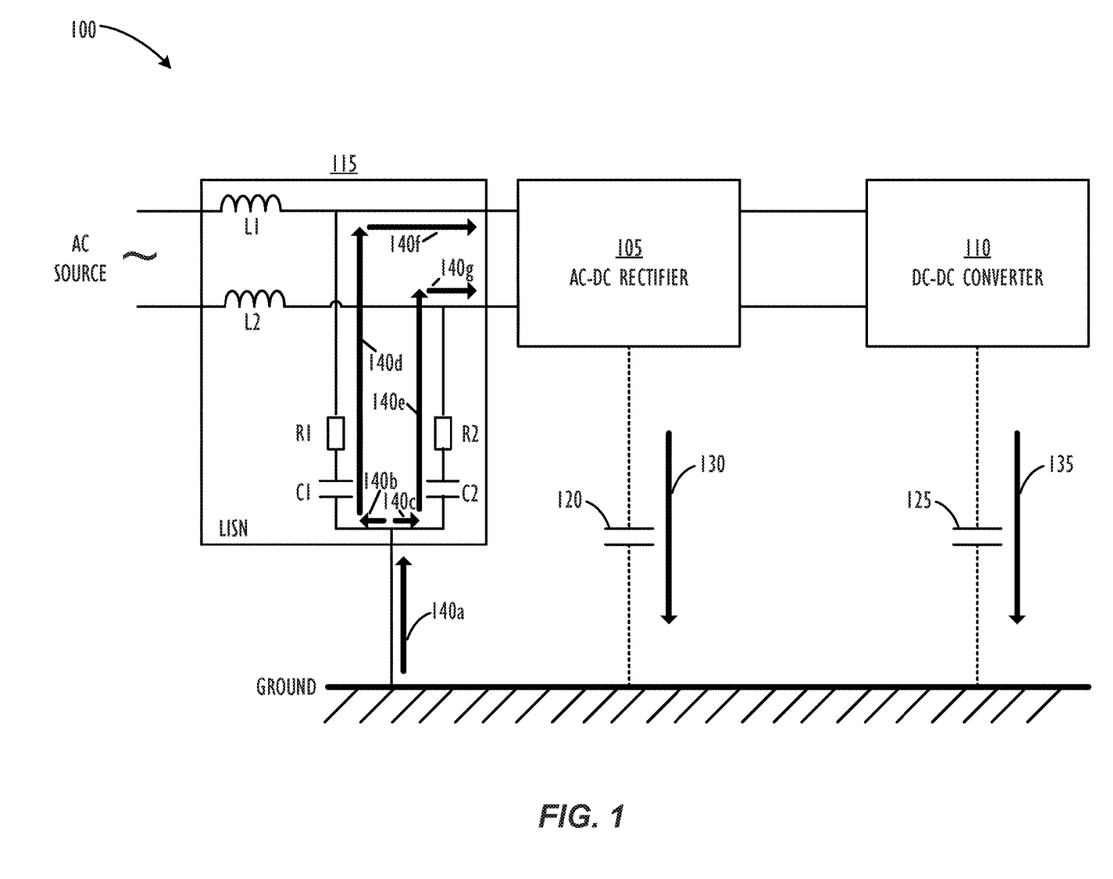
FIG. 1 shows exemplary power converter 100 to illustrate common mode current transmission.

FIG. 1 shows exemplary power converter 100 to illustrate an example of common mode current transmission in a power conversion system. Converter 100 may include AC-DC rectifier 105, which may rectify an AC input voltage from an AC source and provide an intermediate DC voltage to DC-DC converter 110. DC-DC converter 110 may further convert the intermediate DC voltage to a regulated DC output voltage. Rectifier 105 and converter 110 may include semiconductor switches. As described above, the switching operations of the switches may generate common mode currents and noise. The common mode noise may be mitigated either by cancelling it or by maintaining it within the device, i.e., converter 100. For example, converter 100 may include line impedance stabilization network (LISN) 115. LISN 115 may provide one or more of a multiplicity of functions. For example, it may prevent unwanted noise coming from the AC source into converter 100. LISN 115 may likewise block common mode currents escaping from converter 100 to the AC source. Additionally, LISN 115 may provide a stable loop impedance to facilitate repeatable common mode noise measurements, which may be required for EMI performance testing.

As shown in FIG. 1, LISN 115 may include inductors L1/L2, capacitors C1/C2 and resistors R1/R2. Inductors L1/L2 may be coupled in series with the corresponding input wires between the AC source and rectifier 105, while series-connected resistor-capacitor combinations R1/C1 and R2/C2 may be coupled to the respective input lines between ground and the input terminal of rectifier 105. Each of rectifier 105 and converter 110 may generate common mode currents 130/135 flowing to ground through the corresponding grounding capacitances 120/125. Resistor-capacitor combinations R1/C1 and R2/C2 may exhibit low impedances at the relatively high frequencies of the common mode currents (i.e., they act as high pass filters). These low impedance paths may provide conducting paths to recirculate the common mode current back to converter 100—along current paths 140a-140g. Meanwhile, inductors L1/L2 may exhibit high impedances at the relatively high frequencies of the common mode noise (i.e., they act as low pass filters) and may therefore block the common mode currents from entering the AC source.

Figure 2:
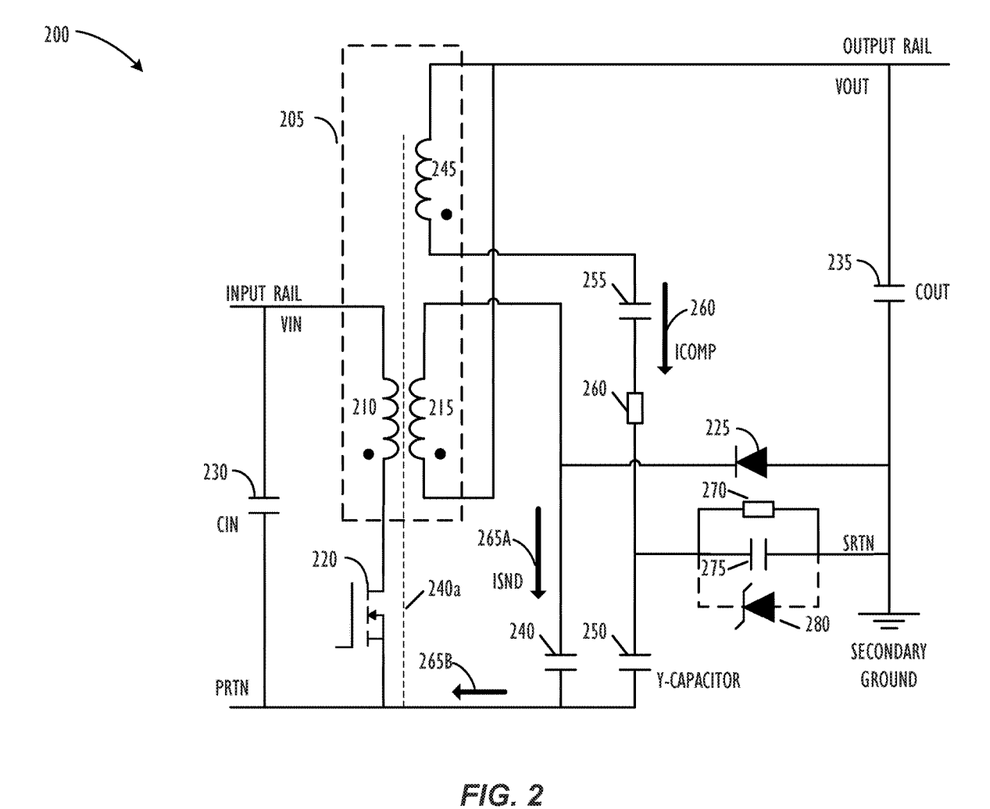
FIG. 2 shows exemplary converter 200.

FIG. 2 shows an exemplary converter 200. Converter 200 may receive an input voltage VIN at an input terminal (including an input rail and a primary return terminal, i.e., PRTN or primary ground) and provide an output voltage $V_{OUT}$ at an output terminal (including an output rail and a secondary return terminal, i.e., SRTN or secondary ground). Converter 200 may comprise transformer 205 with primary winding 210 and secondary winding 215. Primary winding 210 may be coupled in series with primary switch 220 to the input terminal. Secondary winding 215 may be coupled through secondary switch, e.g., diode 225, to the output terminal. Converter 200 may have input capacitor 230 and output capacitor 235 across respective input/output terminals and primary/secondary return terminals. These capacitors may be used to filter and/or stabilize respective input/output voltages. Note that FIG. 2 depicts primary switch 220 as a field effect transistor (FET) and secondary switch 225 as a diode. They could alternatively be other types of semiconductor devices that may be used as a switch, such as metal oxide semiconductor FET (MOSFET), insulated gate bipolar transistor (IGBT), Gallium Nitride devices (GaN), silicon carbon devices, etc.

In analysis of common mode currents, converter 200 may be thought of having a capacitance to ground from each node in the system. Trying to include and determine the effects of all those capacitance would be challenging, if not impossible. However, because the magnitude of common mode currents flowing to ground at each point is determined by the magnitude of the voltage transients dV/dt and the values of the capacitances, the analysis can be focused onto one or two areas of the converter where these effects are greatest, i.e., the areas with greatest voltage transients and/or highest parasitic capacitances. For converter 200, the locations of semiconductor switches, such as primary switch 220 and secondary switch 225, are normally where high dV/dt as well as relatively large parasitic capacitances may be expected. As described above, converter 200 may use a shield layer 240a inside transformer 205 to mitigate the inducement of common mode currents from the primary side to the secondary side. However, the voltage transients caused by secondary switch 225 may still result in common mode currents. FIG. 2 shows capacitor 240 that is coupled between secondary winding 215 and PRTN to depict the parasitic capacitance formed between secondary winding 215 and shield layer 240a that is terminated to PRTN as described above. Capacitor 240, with the voltage transients caused by secondary switch 225, may cause a common mode current ISND, as shown by arrowed line 265a in FIG. 2.

Converter 200 may further comprise auxiliary winding 245. As shown in FIG. 2, auxiliary winding 245 may be electromagnetically coupled with primary winding 210. The un-dotted terminal of auxiliary winding 245 may be coupled to the dotted terminal of secondary winding 215, while both the dotted terminal of auxiliary winding 245 and un-dotted terminal of secondary winding 215 may be coupled to PRTN. Thus, auxiliary winding 245 essentially has an opposite polarity or is anti-parallel connected to secondary winding 215. In particular, the dotted terminal of auxiliary winding 245 may be coupled to PRTN through Y-capacitor 250, compensation capacitor 255 and optional resistor 260. Because auxiliary winding 245 possesses an opposite polarity, it may generate a common mode current $I_{COMP}$ (shown by arrowed line 260) via compensation capacitor 255, which may cancel (i.e., neutralize or negate) the common mode current $I_{SND}$ (shown by arrowed line 265a) induced by the secondary switch. The resultant common current may return to PRTN as shown by arrowed line 265b. The common mode current cancelation or reduction will be further described in following paragraphs with reference to FIG. 3. Note that optional resistor 260 may be selected, for example, up to hundreds of Ohms, to dampen resonances of by parasitic components at relatively high frequencies.

Still in FIG. 2, converter 200 may further include a coupler impedance, comprising parallel-connected capacitor 275 and optional resistor 270 between secondary return terminal (SRTN) and Y-capacitor 250. Coupler capacitor 275 and optional resistor 270 may function as a voltage divider to adjust the allocation of voltages between compensation capacitor 255 and Y-capacitor 250, thus protecting the components and assisting the compliance of performance or safety testing, for example, insulation test and surge test. This will be further described in following paragraphs with reference to FIGS. 4 and 5. Further, optional resistor 270 may also serve as a bleeding resistor to discharge coupler capacitor 275. Additionally, converter 200 may include optional voltage clamping circuit, for example, Zener diode 280, coupled in parallel with coupler capacitor 275 and optional resistor 270. Zener diode 280 may clamp surge voltages across coupler capacitor 275 and optional resistor 270 and thus protect them from overvoltage. Zener diode 280 may also act as a transient voltage suppressor (TVS) that clamps surge voltages of both polarities (i.e., positive and negative) across capacitor 275 and optional resistor 270 when bipolar voltage clamp may be desired.

Figure 3:
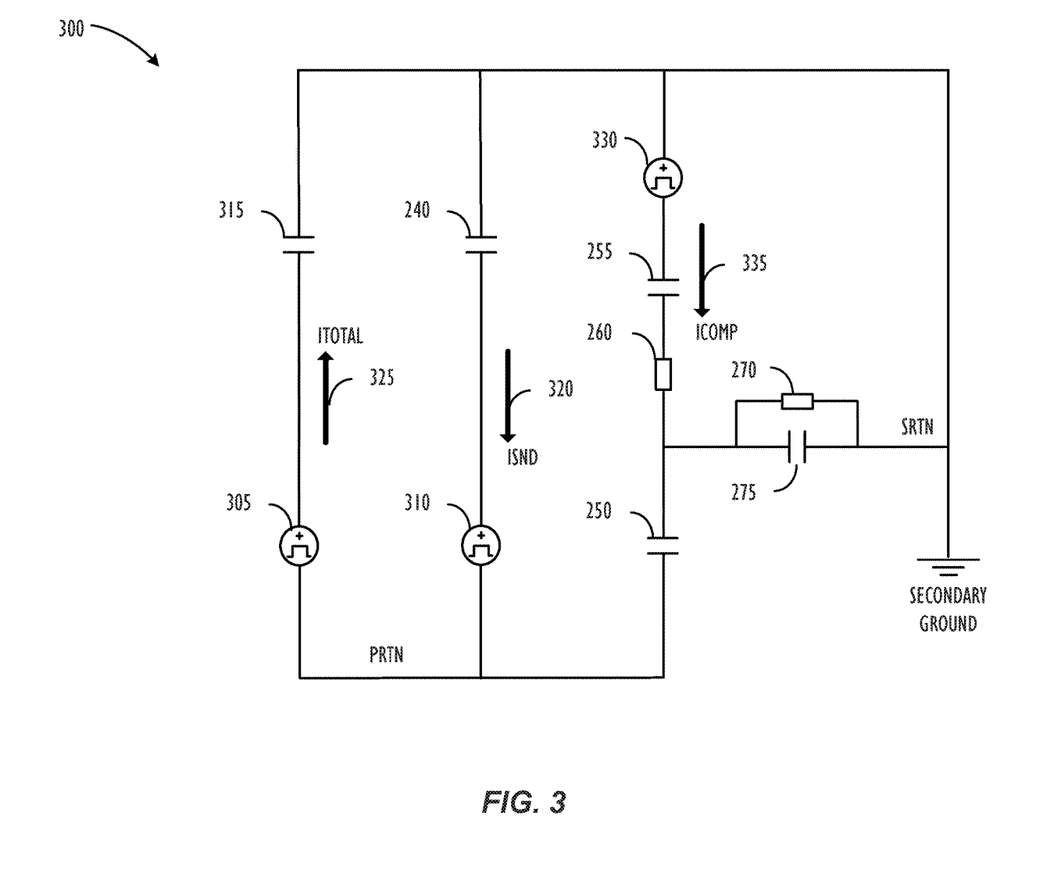
FIG. 3 shows equivalent circuit 300 of converter 200 under common mode analysis.

FIG. 3 shows equivalent circuit 300 of converter 200 under common mode analysis. As one may expect, because this is an equivalent circuit, only the primary relevant components are depicted in FIG. 3. Further, to facilitate understanding and cross-reference between FIGS. 2 and 3, components appearing in both FIGS. 2 and 3 will be labeled under the same designations. As described above, the common mode current analysis will focus on primary switch 220 and secondary switch 225. In FIG. 3, a voltage transient associated with primary switch 220 may be represented by voltage source 305, and a voltage transient associated with secondary switch 225 may be represented by voltage source 310. Each device may also have a parasitic capacitance to ground, represented by respective capacitors 315 and 240.

Voltage transients associated with primary switch 220 and secondary switch 225 may cause common mode currents $I_{TOTAL}$ and $I_{SND}$, shown by arrowed lines 320 and 325. Additionally, auxiliary winding 245 may also create a voltage transient, represented by voltage source 330 in FIG. 3. As shown in FIG. 2, auxiliary winding 245 may be in an opposite polarity to secondary winding 215. Thus, voltage source 330 may inject common mode current $I_{COMP}$ 335 (which is in opposite polarity with $I_{SND}$) via Y-capacitor 250, compensation capacitor 255, and optional resistor 260. Because both currents $I_{SND}$ and $I_{COMP}$ ultimately return to PRTN, Y-capacitor 250, compensation capacitor 255, and optional resistor 260 may be chosen such that $I_{COMP}$ and $I_{SND}$ may substantially cancel each other (i.e., by substantially equal and/or opposite). This can reduce the total common mode current $I_{TOTAL}$.

The impedance of the capacitors will vary as a function of frequency. In many cases, the frequency of interest may be the dominant common mode frequency of the circuit. More specifically, coupler capacitor 275 and optional resistor 270 may be selected so as to provide an impedance at the relatively high common mode frequencies, which may be larger than Y-capacitor 250, thus allowing compensation current $I_{COMP}$ to be injected into PRTN through Y-capacitor 250. Because the impedance of the combination of coupler capacitor 275 and optional resistor 270 may be larger than Y-capacitor 250, one may treat parallel-connected coupler 275 and optional resistor 270 as an open circuit, and thus $I_{COMP}$ would be determined primarily by the voltage of auxiliary winding 245 and both capacitors 250 and 255. In other words, converter 200 may leverage the capacitance of Y-capacitor 250 to generate the compensation current $I_{COMP}$. This can reduce the required capacitance of compensation capacitor 255, which in turn can reduce its volume and footprint. For example, a ratio between compensation capacitor 255 and Y-capacitor 250 may be in the range of 1:10, while a ratio between coupler capacitor 275 and Y-capacitor 250 may be in the range of 10:1.

Figure 4:
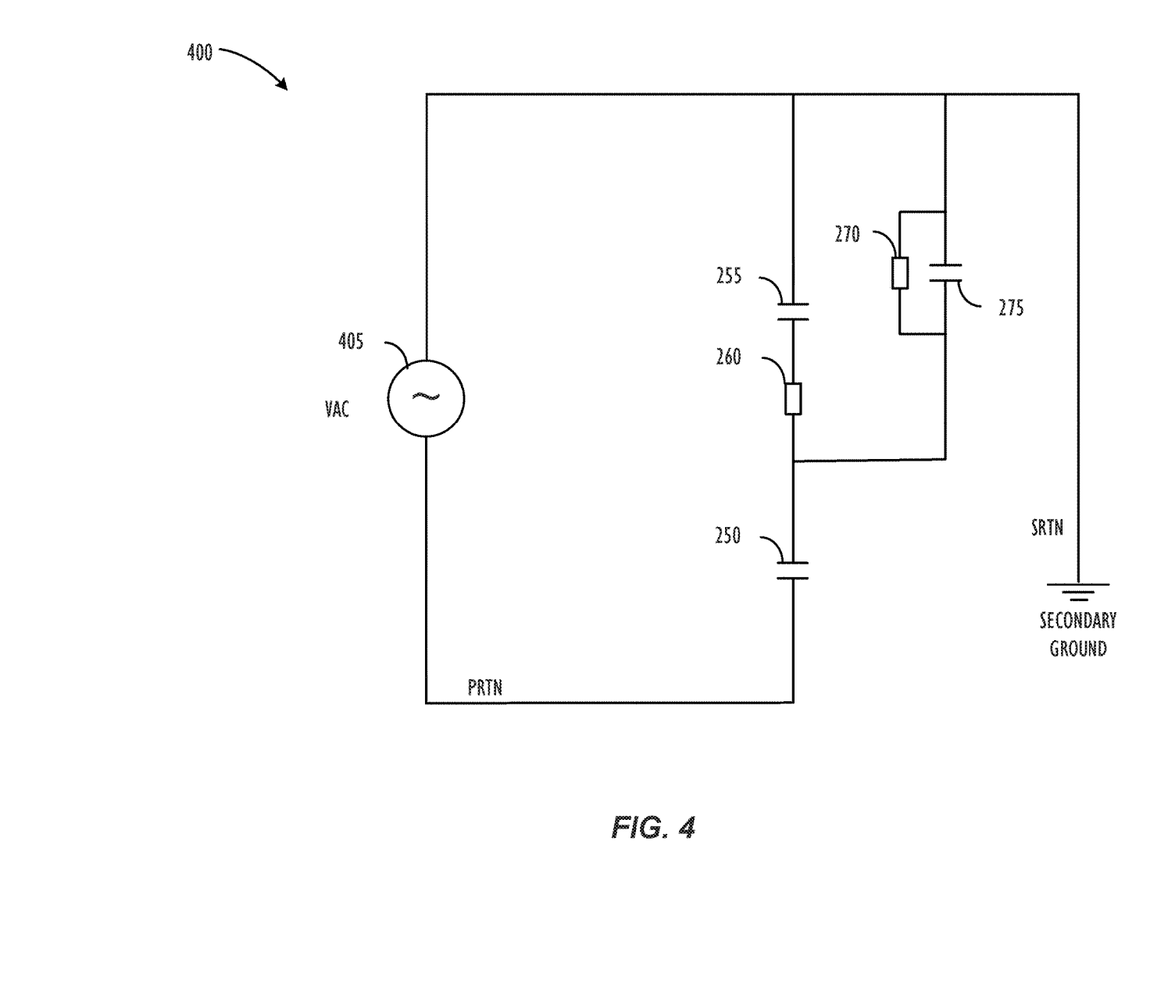
FIG. 4 shows equivalent circuit 400 of converter 200 under an insulation test.

FIG. 4 shows equivalent circuit 400 of converter 200 under an insulation test. Again, components appearing in both FIGS. 2 and 4 are labeled with the same designation. The insulation test, also called a high potential (HiPOT) test, may be used as a quality control measurement. It checks the dielectric and insulation levels of a converter to ensure its compliance with safety standards. As shown in FIG. 4, during an insulation test, converter 200 may be de-energized, i.e., no input voltage $V_{IN}$ provided to the primary side. Instead, a testing voltage $V_{AC}$ (represented by voltage source 405) may be applied across the PRTN and SRTN. Leakage currents of the converter may be measured, and insulation resistance may be calculated to determine whether the insulating requirements are met. The testing voltage $V_{AC}$ may selected according to an applicable standard provided by, for example, International Electrotechnical Commission (IEC), National Electric Code (NEC), European Standard (EN), Institute of Electrical and Electronics Engineers (IEEE), etc. The testing voltage may be a line frequency (e.g., 50 or 60 HZ) AC voltage, or, in some cases, may be a DC voltage. Because the insulation test may be conducted at a frequency much lower than the common mode current frequencies, coupler capacitor 275 and optional resistor 270 may act as a voltage divider to allocate voltage drops between Y-capacitor 250 and the series combination of compensation capacitor 255 and optional resistor 260. In particular, coupler capacitor 275 and optional resistor 270 may be selected to provide a low impedance at the relatively low (testing) frequencies, thus allowing Y-capacitor 270 to bear most of the applied voltage $V_{AC}$. Because compensation capacitor 255 and optional resistor 260 may see only small voltage stresses, they may employ components having small volumes, such as surface-mount parts.

Figure 5:
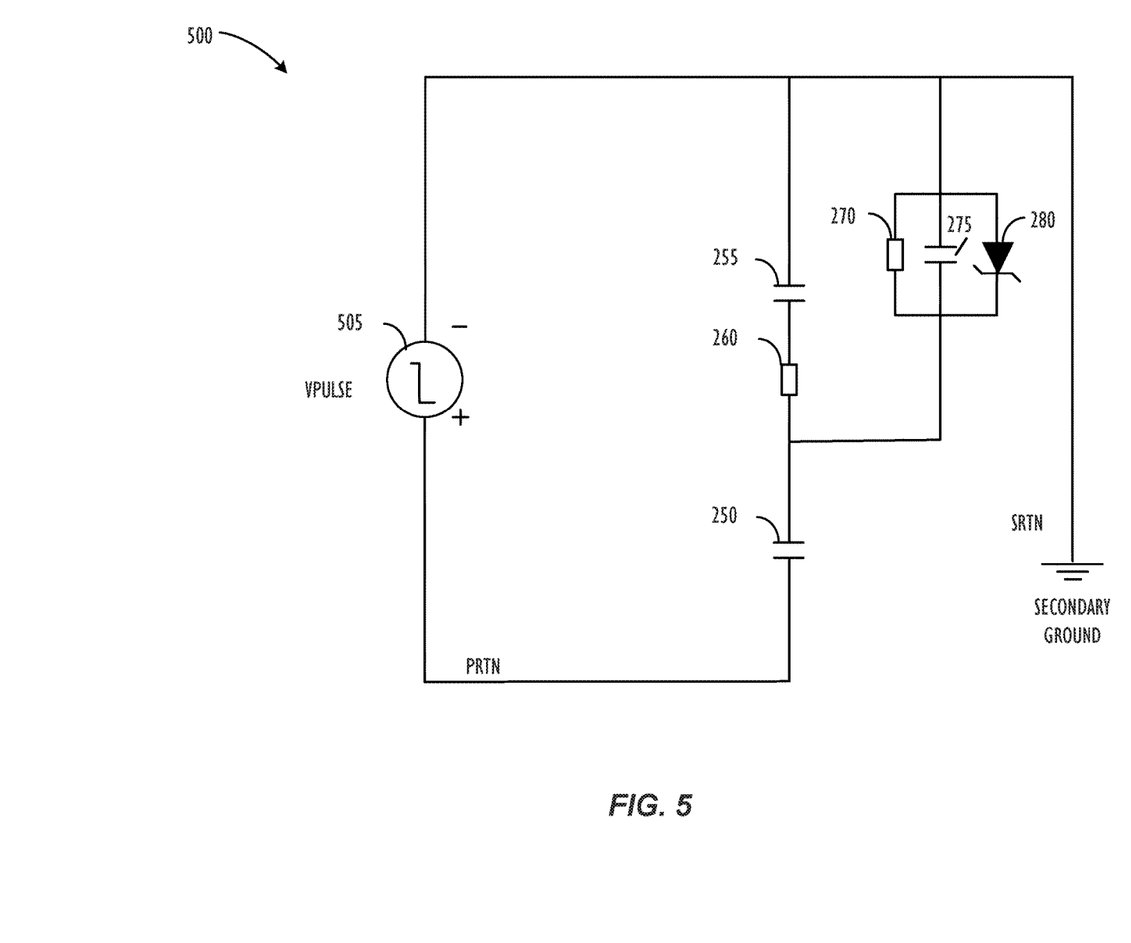
FIG. 5 shows equivalent circuit 500 of converter 200 under a surge test.

FIG. 5 shows equivalent circuit 500 of converter 200 under a surge test. Again, components appearing in both FIGS. 2 and 5 are labeled with the same designation to facilitate the descriptions and cross-reference. During a surge test, converter 200 may be de-energized, i.e., no input voltage $V_{IN}$ provided to the primary side, and a pulse voltage $V_{PULSE}$ (represented by voltage source 505) may be applied across the PRTN and SRTN. The pulse voltage may be provided, for example, by discharging a capacitor inside a surge tester. Currents flowing through converter 200 may be measured to detect abnormal currents occurring as a result of the surge. Because $V_{PULSE}$ may be discharged very quickly coupler capacitors 275 and optional resistor 270 may exhibit a relatively high impedance and thus may have a relatively high voltage drop across themselves. Therefore, converter 200 may further employ optional Zener diode 280 to clamp the voltage rise across capacitors 275 and optional resistor 270 during such a surge test. As a result, capacitors 275 and optional resistor 270 may have lower voltage ratings and thereby lower volumes, taking up less space in the converter.

To summarize, with respect to common mode currents, coupler capacitor 275 and optional resistor 270 may exhibit a relatively high impedance, allowing auxiliary winding 245 to inject common mode compensation current $I_{COMP}$ through compensation capacitor 255 and Y-capacitor 250. During an insulation test, coupler capacitor 275 and optional resistor 270 may exhibit a relatively low impedance, causing only low voltage stresses on compensation capacitor 266 and optional resistor 260. Therefore, compensation capacitor 266 and optional resistor 260 may employ components having relatively lower voltage ratings and correspondingly smaller sizes. Finally, under a surge test, Zener diode 280 may clamp the voltage across coupler capacitor 275 and optional resistor 270, further allowing use of components having relatively lower voltage ratings and correspondingly smaller sizes.

The various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A converter, comprising: an input terminal; an output terminal; and a transformer isolating the input terminal and the output terminal, the transformer having: a primary winding coupled with the input terminal via a primary switch, a secondary winding having a first terminal coupled to an output rail of the output terminal and a second terminal coupled to a secondary ground of the output terminal, the secondary winding further being capacitively coupled to a primary return of the input terminal, and an auxiliary winding coupled in anti-parallel with the secondary winding via a first capacitor and a second capacitor, the auxiliary winding having a first terminal of opposite polarity to the first terminal of the secondary winding coupled to the output rail and a second terminal of opposite polarity to the second terminal of the secondary winding coupled to the secondary ground, the auxiliary winding further being capacitively coupled to a primary return of the input terminal, the auxiliary winding being thereby configured to inject a first common mode current to reduce a second common mode current caused by a secondary switch coupled between the secondary winding and the output terminal.

2. The converter of claim 1, further comprising a first resistor coupled in series with the first capacitor.

3. The converter of claim 1, further comprising a third capacitor coupled with the first capacitor and the second capacitor.

4. The converter of claim 3, further comprising a second resistor coupled in parallel with the third capacitor wherein the third capacitor and the second resistor are configured to provide an impedance varying in response to a frequency.

5. The converter of claim 4, wherein the third capacitor and the second resistor are configured to provide a high impedance at a relatively high frequency so as to allow the injected first common mode current flowing through the first capacitor and the second capacitor.

6. The converter of claim 4, wherein the third capacitor and the second resistor are configured to provide a low impedance at a relatively low frequency so as to allocate more voltage on the second capacitor than on the first capacitor.

7. The converter of claim 3, further comprising a voltage clamping circuit to clamp a voltage of the third capacitor.

8. A method to mitigate common mode current in a converter having a transformer isolating an input terminal and an output terminal by a primary winding and a secondary winding, comprising:
coupling the secondary winding to the output terminal such that a first terminal of the secondary winding is coupled to an output rail of the output terminal and a second terminal of the secondary winding is coupled to a secondary ground of the output terminal, wherein the secondary winding is further capacitively coupled to a primary return of the input terminal; and
coupling an auxiliary winding in anti-parallel with the secondary winding via series-connected first and second capacitors, the auxiliary winding having a first terminal of opposite polarity to the first terminal of the secondary winding coupled to the output rail and a second terminal of opposite polarity to the second terminal of the secondary winding coupled to the secondary ground, the auxiliary winding being further capacitively coupled to the primary return, the auxiliary winding being thereby configured to inject a first common mode current to reduce a second common mode current caused by a secondary switch coupled between the secondary winding and the output terminal.

9. The method of claim 8, further comprising damping a resonance by a first resistor coupled in series with the first capacitor.

10. The method of claim 8, further comprising providing an impedance varying in response to a frequency by using a third capacitor and a second resistor.

11. The method of claim 10, wherein the third capacitor and the second resistor are configured to provide a high impedance at a relatively high frequency so as to allow the injected first common mode current flowing through the first capacitor and the second capacitor.

12. The method of claim 10, wherein the third capacitor and the second resistor are configured to provide a low impedance at a relatively low frequency so as to allocate more voltage on the second capacitor than on the first capacitor.

13. The method of claim 8, further comprising clamping a voltage of the third capacitor by a voltage clamping circuit.

14. A converter, comprising:
an input terminal including an input rail and a primary return terminal;
an output terminal including an output rail and a secondary return terminal; and
a transformer isolating the input terminal and the output terminal, the transformer having:
a primary winding coupled with the input rail and the primary return terminal via a primary switch,
a secondary winding coupled with the output rail and the secondary return terminal via a secondary switch,
a shield layer between the first winding and the secondary winding and coupled with the primary return terminal, and
an auxiliary winding electrically coupled with the output rail and the secondary return terminal in anti-parallel with the secondary winding and further coupled to the primary return terminal via a first capacitor and a second capacitor.

15. The converter of claim 14, further comprising a first resistor coupled between the first capacitor and the primary return terminal.

16. The converter of claim 14, further comprising a third capacitor coupled with the first capacitor and the second capacitor and between the combination of the first capacitor and the second capacitor and the secondary return terminal.

17. The converter of claim 16, further comprising a second resistor coupled in parallel with the third capacitor configured to provide an impedance varying in response to a frequency.

18. The converter of claim 17, wherein the third capacitor and the second resistor are configured to provide a high impedance at a relatively high frequency so as to inject a first common mode current through the first capacitor to reduce a second common mode current caused by the secondary switch.

19. The converter of claim 16, wherein the third capacitor and the second resistor are configured to provide a low impedance at a relatively low frequency so as to allocate more voltage on the second capacitor than on the first capacitor.

20. The converter of claim 14, further comprising a voltage clamping circuit to clamp a voltage of the third capacitor.

* * * * *